United States Patent
Hanson et al.

(10) Patent No.: US 7,881,449 B2
(45) Date of Patent: Feb. 1, 2011

(54) ENHANCED CALL NOTIFICATION SERVICE

(75) Inventors: Karrie J. Hanson, Westfield, NJ (US);
Gerald M. Karam, Morristown, NJ (US); Gregory W. Bond, Hoboken, NJ (US); Healfdene H. Goguen, South Orange, NJ (US); Donnie Henderson, Manalapan, NJ (US); Pamela Zave, Chatham, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 10/953,905

(22) Filed: Sep. 29, 2004

(65) Prior Publication Data

US 2005/0069097 A1 Mar. 31, 2005

Related U.S. Application Data

(60) Provisional application No. 60/507,188, filed on Sep. 30, 2003.

(51) Int. Cl.
*H04M 3/42* (2006.01)

(52) U.S. Cl. ............................. 379/211.02; 379/201.02

(58) Field of Classification Search ................ 379/164, 379/177–185, 196–200, 211.03–211.05, 379/211.02, 211.01, 88.03, 201.02
See application file for complete search history.

(56) References Cited

U.S. PATENT DOCUMENTS

| | | | | |
|---|---|---|---|---|
| 4,720,848 A | | 1/1988 | Akiyama | |
| 5,206,901 A | * | 4/1993 | Harlow et al. | 379/211.04 |
| 5,392,342 A | * | 2/1995 | Rosenthal | 379/211.03 |
| 5,475,748 A | * | 12/1995 | Jones | 379/211.04 |
| 5,487,111 A | * | 1/1996 | Slusky | 379/211.03 |
| 5,896,448 A | * | 4/1999 | Holt | 379/221.03 |
| 5,905,789 A | * | 5/1999 | Will | 379/211.03 |
| 5,917,817 A | | 6/1999 | Dunn et al. | |
| 5,930,338 A | * | 7/1999 | McKendry et al. | 379/88.25 |
| 6,104,799 A | | 8/2000 | Jain et al. | |
| 6,337,857 B1 | * | 1/2002 | Booton | 370/352 |
| 6,516,060 B1 | * | 2/2003 | Foladare et al. | 379/211.03 |
| 6,526,129 B1 | * | 2/2003 | Beaton et al. | 379/90.01 |
| 6,594,230 B1 | | 7/2003 | Yaker | |
| 6,597,781 B2 | * | 7/2003 | Schwab et al. | 379/211.02 |
| 6,614,783 B1 | | 9/2003 | Sonesh et al. | |
| 6,631,186 B1 | | 10/2003 | Adams et al. | |
| 6,647,111 B1 | | 11/2003 | Bjornberg et al. | |

(Continued)

FOREIGN PATENT DOCUMENTS

EP 1 248 445 A 10/2002

(Continued)

*Primary Examiner*—Olisa Anwah
(74) *Attorney, Agent, or Firm*—Hoffmann & Baron, LLP (57) ABSTRACT

The present invention provides a system and a method for providing notification of an incoming call from the calling party to the called party. The method includes receiving a request to connect the call from the calling party to plurality of end devices of the called party. A profile information associated with the called party is retrieved. The profile information includes data on plurality of the end devices provisioned to be alerted upon connection of the incoming call and on instructions for alerting the end devices in a specific sequence. Additionally, the end devices of the incoming call are alerted in accordance with the specific sequence which would be either parallel ringing order or sequential ringing order.

13 Claims, 8 Drawing Sheets

U.S. PATENT DOCUMENTS

| | | | |
|---|---|---|---|
| 6,678,366 B1* | 1/2004 | Burger et al. | 379/211.03 |
| 6,694,004 B1* | 2/2004 | Knoerle et al. | 379/211.04 |
| 6,697,478 B1* | 2/2004 | Meldrum et al. | 379/211.04 |
| 6,751,459 B1* | 6/2004 | Lee et al. | 455/445 |
| 6,931,116 B1* | 8/2005 | Gross et al. | 379/211.03 |
| 6,937,713 B1* | 8/2005 | Kung et al. | 379/211.02 |
| 6,963,633 B1* | 11/2005 | Diede et al. | 379/88.03 |
| 6,978,004 B1* | 12/2005 | Levine | 379/211.04 |
| 7,016,483 B2* | 3/2006 | Schwab et al. | 379/211.02 |
| 7,194,080 B2* | 3/2007 | Worsham et al. | 379/211.03 |
| 7,260,384 B2* | 8/2007 | Bales et al. | 455/413 |
| 7,295,661 B2* | 11/2007 | Akhteruzzaman | 379/201.02 |
| 7,372,951 B2* | 5/2008 | Schwab et al. | 379/211.02 |
| 2003/0005150 A1* | 1/2003 | Thompson et al. | 709/238 |
| 2003/0056226 A1* | 3/2003 | Lazarus et al. | 725/129 |
| 2003/0063733 A1* | 4/2003 | Levine et al. | 379/211.04 |
| 2003/0215075 A1* | 11/2003 | Schwab et al. | 379/201.02 |
| 2004/0125931 A1* | 7/2004 | Archer | 379/201.01 |
| 2005/0009526 A1* | 1/2005 | Sheinbein et al. | 455/445 |
| 2005/0063529 A1* | 3/2005 | Meldrum et al. | 379/211.04 |

FOREIGN PATENT DOCUMENTS

| | | |
|---|---|---|
| WO | WO 99/67922 A | 12/1999 |
| WO | WO 02/25912 A | 3/2002 |

* cited by examiner

LEGEND
14 end device
16 gateway
17 device
20 fast router
22 application server
30 terminal adaptor

| Network Elements | Signaling Interface |
|---|---|
| TA – ASX | MGCP |
| TA <–> Vplus AS | RTP (2-way) |
| TA<->GSX | RTP (2-way) |
| Media Server ->TA | RTP (1-way) |
| ASX – PSX | Sonus Diameter+ |
| ASX – GSX | SIP |
| ASX – Media Server (SnowShore) | SIP |
| ASX – VPlus AS | SIP |
| ASX - DNS (SAS-VP) | DNS query UDP |
| GSX – PSX | Sonus Diameter+ |
| VPlus AS – PSX | SIP |
| VPlus AS – GSX | SIP, RTP |
| VPlus AS – Conference Server | MGCP |
| VPlus AS – VoiceXML Server | SIP |
| GSX – LNS Switch | NI 2, PRI |
| LNS Switch – 4ESS | SS7 |
| LNS Switch – ILEC Switch | SS7 or MF |
| TA – Provisioning Server (SAS-VP) | HTTP XML |
| TA – TFTP Server (SAS-VP) | TFTP |
| TA – PPPoE Server | PPPoE |

ENHANCED CALL NOTIFICATION SERVICE

CROSS REFERENCE TO RELATED APPLICATIONS

This Application claims priority to U.S. Provisional Patent Application No. 60/507,188 filed on Sep. 30, 2003, which is herein incorporated by reference in its entirety.

FIELD OF THE INVENTION

The present invention relates to telephony services and, more particularly, services for enhanced telephony services for call management.

Acronyms

The written description provided herein contains acronyms which refer to various telecommunication services, components and techniques, as well as features related to the present invention. For purposes of the written description herein, the acronyms are defined as follows:
Access Director Server (ADS)
Common Backbone Network (CBB)
Digital Subscriber Line (DSL)
Directory Number (DN)
Dual Tone Multi-Frequency (DTMF)
Ethernet Switches (ES)
High Speed Data Network (HSD)
Independent Local Exchange Companies (ILEC)
Integrated Network Management System (INMS)
Integrated Services Digital Network (ISDN)
Interactive Products and Service (IPS)
Interactive Voice Response (IVR)
Internet Protocol (IP)
Local Network Services (LNS)
Multimedia Gateway Control (MGCP)
North American Numbering Plan (NANP)
Numbering Plan Area (NPA)
Primary Rate Interface (PRI)
Public Switch Telephone Network (PSTN)
Real-Time Transfer Protocol (RTP)
Service Group (SG)
Service Provisioning System (SPS)
Session Initiation Protocol (SIP)
Sonus Data System Integrator (DSI)
Terminal Adaptor (TA)
Time Division Multiplex (TDM)
Voice Over Internet Protocol (VoIP)

BACKGROUND OF THE INVENTION

The availability of various communication system networks has been increasing exponentially over the past decade. Among these networks are the conventional wired Public Switched Telephone Network (PSTN), packet-switched data networks such as the Internet, wireless satellite networks, and the like. The increased availability of these communication system networks provides opportunities and needs for enhanced information management among these networks.

Presently, subscriber services available to users of these networks are usually administered by a control center having access only to a particular communication network or group of networks. To access these subscriber services, a subscriber must often call a customer service representative or interact with an interactive voice response (IVR) system using a standard dual tone multi-frequency (DTMF) telephone device. However, a subscriber may want to manage information flow without having to first access a call agent at the control center or to manage information flow outside the control center network. Accordingly, it would be advantageous for a user to be able to provision and invoke various services without having to be associated with a particular control center or be limited to a particular network or networks.

A user, also referred to herein as a subscriber, may want to manage information flow and access among his multiple communication devices. For example, multiple parties may attempt to contact a subscriber while the subscriber is actively involved in an ongoing call. For instance, a calling party may attempt to contact a subscriber on one end device, while the subscriber may only have access to another end device at the time the call is placed. In this case, it would be advantageous for a subscriber to be able to provision services so as to decide which end device or devices will receive an incoming call, and in what order. The subscriber would then be able to accept a call on any of the provisioned end devices from an incoming call from any network.

It would be advantageous, if a subscriber could perform functions or service features, such as directing incoming calls to multiple communication end devices, in accord with a predetermined profile information (such as the identity (phone number or internet address) and order of end devices to be contacted), regardless of the particular communication network with which the devices are associated.

Furthermore, it would be advantageous if a subscriber could self-provision such service features without having to first contact a customer service representative or wait for selected service features to be activated.

SUMMARY OF THE INVENTION

The present invention provides a method for providing notification of at least one incoming call from at least one calling party to at least one called party. The method includes receiving a request to transmit the incoming call from the calling party to a plurality of end devices of the called, retrieving profile information associated with the called party. The profile information includes data on the plurality of the end devices provisioned to be alerted upon receipt of the incoming call and on instructions for alerting the end devices in a specific sequence. Additionally, the end devices are alerted of the incoming call in accordance with the specific sequence, wherein the sequence includes a parallel ringing order or a sequential ringing order.

Also provided is a system architecture for implementing the method of the present invention which takes advantage of packet-switched telephony across a high-speed data network. The system manages providing notification of incoming calls from at least one calling party to at least one called party. The system includes an internet protocol network connected to at least one end device of the called party at least one gateway for receiving a request to transmit the incoming call from the calling party to a plurality of the end device of the called party, and at least one platform connected to the gateway for handling the request from the gateway. The handling includes, retrieving profile information associated with the called party, where the profile information includes data on the plurality of the end devices provisional to be alerted upon transmission of the incoming call, on instructions for alerting the end devices in a specific sequence.

DETAILED DESCRIPTION OF THE PREFERRED EMBODIMENTS

Service Architecture

Figure 1:
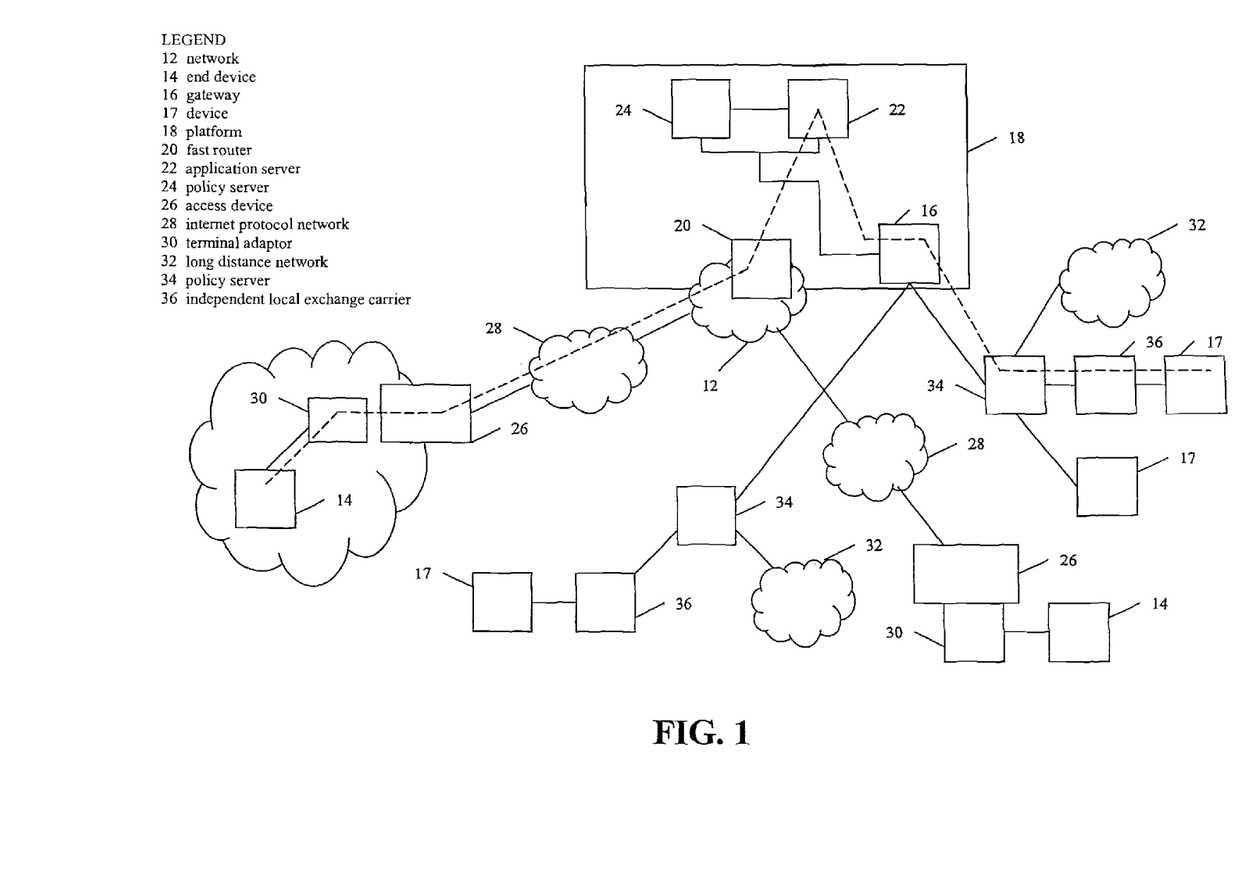
FIG. 1 is a block diagram of a system architecture representing an embodiment of the present invention.

Referring now to the drawings, FIG. 1 shows an embodiment of a system 10, which is suitable for implementation of the enhanced call notification method of the present invention. System 10 includes an internet protocol network 12 connected to at least one end device 14 of a called party. System 10 further includes at least one gateway 16 for receiving an incoming call from a device 17 of a calling party designated to arrive at the end device 14 of the called party. The system also includes a platform 18, preferably a VoIP platform connected to gateway 16 for handling the incoming call received from the gateway without ringing the called party's end device 14. The handling of the incoming call from device 17 includes retrieving profile information associated with the called party and processing the call based on the profile information. The profile information includes data on the plurality of the end devices 14 provisioned to be alerted upon receipt of the incoming call, and a "locate me" service including instructions on alerting the end devices 14 on a specific sequence such as a parallel ringing order or a sequential ringing order and combination thereof. The call is further processed by alerting the end device 14 of the incoming call in accordance with the specific sequence upon activation of the "locate me" service. Platform 18 is connected to network 12 desirably through a fast router 20. Platform 18 can include of a variety of servers. In a preferred embodiment, platform 18 includes at least one application server 22, within which resides the service logic necessary to implement the call management method of the present invention. Application Server 22 has voice over internet capabilities. Routing and policy information can optionally be stored in additional servers, such as policy server 34.

Figure 2:
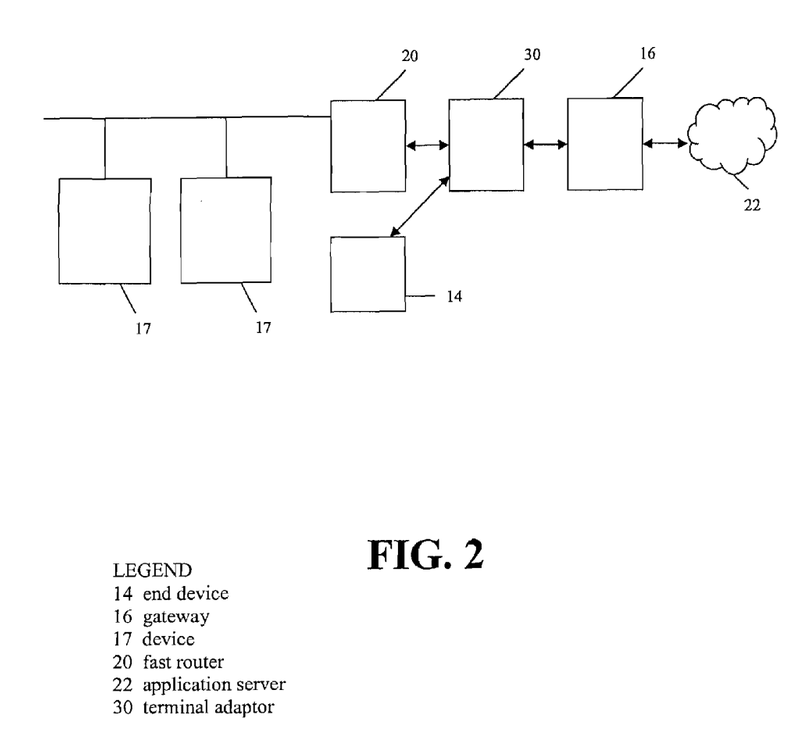
FIG. 2 is a block diagram with a schematic representation of components in one embodiment of a system of the present invention.

A called party is assumed to have access through some form of access device 26 to a high speed data (HSD) network 28. For example, the called party is assumed to have a broadband connection to a broadband access network, provided through a cable or digital subscriber line (DSL) modem. It is preferable that the subscriber have at least 128 Kbps upstream bandwidth. The called party connects their telephone via an RJ-11 jack (not shown) preferably into a terminal adaptor 30 (TA). The TA connects to the called party's cable or DSL modem. The use of the TA can ensure that the called party's data packets do not degrade the voice quality-of-service. FIG. 2 is a more detailed view of how the TA may be adapted for connection to a modem and a home network. Alternatively, and without limitation, end device 14 itself can be a modified integrated access device that connects directly to the modem or the broadband network. Alternatively, and without limitation, the telephone can be a telephony client executed on a data access device, such as a personal computer. It is assumed that the called party also has access through the same access device or a separate access device to data services, such as a Web browser.

The high speed data network 28 provides access to the service provider's internet protocol network 28, such as AT&T's Internet Protocol (IP) Common Backbone Network (CBB). The backbone network is used for call setup signaling and network management. The backbone network is also used to carry the RTP stream to the telephony gateway.

The illustrative VoIP platform 18 is depicted in FIG. 1 and is connected to network 12 illustratively through a fast router 20. The platform can be illustratively composed of a variety of servers connected via a high speed local area network using Ethernet switches (ES) and/or routers to provide access/networking to network 12. The platform has a network gateway border element 18 to a legacy telephone network, e.g. to a long distance network 32 in the Public Switch Telephone Network (PSTN). For example, as shown in FIG. 1, a SONUS GSX 9000 Gateway 16 is shown which is an IP/PSTN gateway that supports SIP-to-PRI signaling and RTP-to-TDM media stream between the IP network and the PSTN. The local network services (LNS) switch 34 shown in FIG. 1 can advantageously support what is known in the art as AT&T PrimePlex Service. Calls from the PSTN to VoIP service subscribers (such as the called party referred to herein) are routed over the PSTN to the LNS switch and terminated over the PRI facility from the LNS switch to the gateway. The gateway uses National ISDN-2 PRI signaling to set up the call to the LNS End Office. The LNS End Office sets up the call to the switched network (4ESS) or other Independent local Exchange Carrier (ILEC) 36 switch using SS7 signaling. The LNS end office also receives calls from the PSTN and directs them to the appropriate PRI facility from the LNS end office to the gateway.

Features of the present invention are implemented in application server(s) 22 in the VoIP platform 18. The service logic necessary to implement the features resides in the application servers while routing and policy information is stored in additional servers that support the capabilities of the application servers.

For example, in one embodiment, the platform 18 shown in FIG. 1 has a number of application servers which can support conventional Class 5 and CLASS features in conjunction with the terminal adaptor 30. The TA receives a dial plan from the at least one application server 22 and notifies the application server 22 when specific digits or signals are received from end device 14 of the called party (who is a VoIP subscriber). For example, the TA notifies the application server 22 when a VoIP service subscriber goes "off-hook" or dials a 10-digit number. Server 22 also directs TA 30 to play specific tones, for example, busy, ringing, and dial tone. The application server 22 can serve as a combination MGCP border element and Class 5 feature application server. Services can be subscribed at either the Directory Number (DN) or Service Group (SG) level. A Service Group is a set of Support for collecting keypad presses and phone set hook actions is provided by the terminal adaptor and its implementation of MGCP. Similarly, to control the generation of tones, the application server 22 can use MGCP to communicate with the terminal adaptor 30. The policy servers 24 are illustratively Sonus PSX 6000 servers which provide routing and policy information to the application server(s) 22 and the gateway 16. The policy server 24 also supports the blocking capabilities used by the application server 22. The application server 22 can query the policy server 24 to determine message routing. The policy server 24 can act much like a Call Control Element, determining if and when the call should be routed to a gateway 16 to access the PSTN. The policy server 24 also determines that the application server 22 should process the call. The application server 22 caches profile information associated with the called party, wherein the profile information includes data on the plurality of the end devices provisioned to be alerted upon receipt of the incoming call, and a locate me service including instructions on alerting the end devices in a specific sequence and combinations thereof. The server 22 also caches VoIP subscriber data used for providing conventional features such as Caller ID, Call Waiting, Call Forwarding, and 3-Way Calling. Persistent VoIP subscriber and feature data can be stored in an Access Directory Server (ADS) and pushed into the application server cache. Once the final call destination is determined (via a query to the policy server), the application server can use MGCP signaling to a TA (for an on-net termination) or SIP signaling to the gateway (for an off-net termination). A record keeping server can also be provided, such as a Sonus Data Stream Integrator (DSI) (not shown), which is capable of capturing call detail records from the other network elements and transforming them into billing system input format, e.g. AMA records.

In accordance with an embodiment of an aspect of the invention, a number of advanced application servers 22, (which are alternatively referred to herein as "VPLUS" servers) are provided which provide the service logic for the advanced features of the VoIP platform. For example, the advanced application servers can be Sun Fire 280R servers with custom service feature software. It is preferable to build the service logic in composable software modules called "feature boxes." See U.S. Pat. Nos. 6,160,883 and 6,404,878, entitled "TELECOMMNICATIONS NETWORK SYSTEM AND METHOD," which are incorporated by reference herein. These feature boxes are invoked for calls involving VoIP subscribers on the core advanced application server whenever a call is placed by or to them. Features can be subscribed to at the DN level. However, it is also advantageous to allow features to be subscribed to by "address patterns." Address Patterns allow the bulk subscription of features to a set of addresses. See co-pending, commonly assigned U.S. Utility patent application Ser. No. 09/644,128, entitled "ROUTING EXTENSIONS FOR TELECOMMUNICATIONS NETWORK SYSTEM AND METHOD," filed on Aug. 23, 2000, the contents of which are incorporated by reference herein. When the features require other resources to perform their service logic, they can invoke capabilities on other parts of the platform: such as a media server and a media bridge. The media server, for example, can be a server that supports VoiceXML and can be used whenever IVR like interaction is required with the VoIP subscriber. That is, whenever voice announcements are to be played or touchtone digits are to be collected, the VoiceXML media server capabilities can be requested by one or more feature boxes in the application server. As part of the invocation of the VoiceXML server, the feature boxes indicate where the appropriate scripts are to be found to direct the specific interaction with the user. Similarly, whenever audio needs to be bridged between more than two parties, the feature boxes involved will reroute the audio media to the media bridge so that the media can be mixed and redistributed to the parties involved.

See co-pending, commonly assigned U.S. Utility patent application Ser. No. 09/716,102, entitled "SIGNALING/MEDIA SEPARATION FOR TELECOMMUNICATIONS NETWORK SYSTEM, filed on Nov. 17, 2000, the contents of which are incorporated by reference herein.

In accordance with an embodiment of another aspect of the invention, the features offered by the advanced application server are desirably invoked or controlled by means of touchtone key presses on the keypad of a phone. These key presses normally generate DTMF tones. For any call where advanced services are available to VoIP subscribers, the advanced application server can monitor for touchtones from the VoIP subscriber. The advanced application server never need modify in any way the touchtone digits that it detects. That is, it does not need to remove them from the media stream; it can merely recognize them in the media stream. So, for example, if a VoIP subscriber presses a wake up sequence, for example, '*' on the keypad, any and all other people on the telephone call at that time will also hear the DTMF tones associated with '*'. When the VoIP subscriber is interacting with the Phone Feature Manager (as described further herein) or the mid-call IVR dialog, the VoIP subscriber is interacting directly with the advanced application server and all other parties on any active calls are on placed on hold. The parties on hold hear nothing of the interaction of the VoIP subscriber with the IVR dialog. That is, they do not hear touchtones entered by the VoIP subscriber nor do they hear any advanced application server announcements.

VoIP subscriber information (including profile information provisioned by the called party regarding whether to store and/or send call information to the called party to a specified address) can reside in a relational database controlled by software on the core server. Feature boxes can query and change subscriber data using an interface to a software component of the core server. It is advantageous to permit VoIP subscribers to individually enable and disable some features using several methods. For the advanced services, VoIP subscribers can enable some of them and disable some of them using either an interactive voice dialog with the Phone Feature Manager or by accessing the trial website and filling out forms there.

Figure 3:
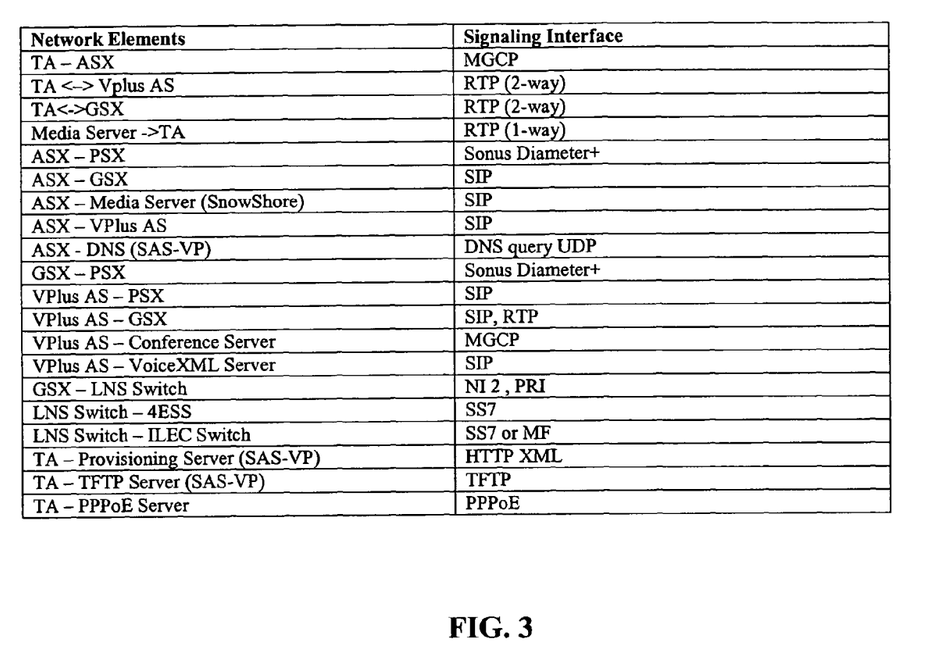
FIG. 3 is an illustrative listing of signal interfaces between components in one embodiment of a system.

FIG. 3 sets forth an illustrative list of signaling interfaces between the components of the service architecture. The embodiment of the present invention herein is described with particular reference to the Internet Protocol (IP) and IP-based protocols such as the Session Initiation Protocol (SIP) and the Real Time Protocol (RTP). It should be noted although that the present invention is not so limited and may be readily extended by one of ordinary skill in the art to different packet-switched protocol schemes.

Provisioning

The VoIP subscriber (e.g., the called party) is assigned a new 10-digit NANP number. The number assigned to the VoIP subscriber is provisioned in the PSTN at the time the PrimePlex telephony service is provisioned from the LNS switch to the gateway. The number is active in the PSTN at that time and will route to the policy and application servers. If the TN has not yet been assigned to a particular VoIP subscriber, (e.g., the called party), the calling parties will hear an announcement that the TN is not a working number. The Phone Feature Manager (also used by Voice Mail) and Personal Conferencing will each have one TN assigned per NPA. These two numbers per NPA will be provided to all users with VoIP TNs within that NPA. The VoIP subscriber's existing IP address associated with their broadband service is the IP address associated with the VoIP subscriber. In addition, the VoIP subscriber can be assigned a Fully Qualified Domain Name (FQDN) using any advantageous format, e.g. such as TNnpanxxxxxx.service.att.com. For calls from the VoIP subscriber TN, all calls can be dialed as 1+NPA-NXX-XXXX. The gateway (as instructed by the policy server) will signal the appropriate dialing plan for the originating PRI facility and the called party number combination to the LNS switch.

In accordance with another aspect of the invention, it is preferable to provide the VoIP subscribers with mechanisms for self-provisioning service features. For example and without limitation, subscribers can be provided with a website portal in conjunction with the advanced application server. It is advantageous to provide a web server to provide a customer website where subscribers go to accomplish three broad sets of tasks: (1) Signing up for service and retrieving account information; (2) Provisioning of advanced services; and (3) Invocation of advanced services. It is also advantageous to provide an HTTP proxy in front of the web server, primarily to provide failover capability in the event that the primary web server fails. The proxy server is the place where HTTP requests first arrive from the subscribers' web browsers. The server then proxies these HTTP requests to the currently active web server.

Alternatively or as a supplemental mechanism to the website portal, a phone feature manager can be provided. The Phone Feature Manager provides VoIP subscribers a telephone number to dial to control their services (as an alternative to the VoIP Web Portal). By calling the Phone Feature Manager, a VoIP subscriber can provision advanced services, retrieve voicemail, return calls to callers who left voicemail, and for whom a return calling number is available, change outgoing message for voicemail, activate/de-activate different services/features, call a speed dial number, call an arbitrary (non-international) number, etc. The Phone Feature Manager can be reached by dialing a speed dial code (e.g., 2-8-8-0-#) from the VoIP device, or by calling one of a service specified set of 10-digit numbers from any phone. The VoIP subscriber can configure auto-login capability for calls placed to the Phone Feature Manager from specified telephone numbers. The options for each telephone number are, for example: (a) Login with VoIP subscriber number and PIN from this telephone number (for TNs unknown to the service); (b) Login with PIN only from this telephone number; or (c) Auto-login from this telephone number (where neither VoIP TN nor PIN is required). For the purposes of announcements and the pre-population of some auto-login numbers, some VoIP subscriber information is gathered from the VoIP subscriber data provided at time of service sign up. There need be no limits imposed on the number of users who can access the Phone Feature Manager using the same VoIP subscriber TN. No login steps are required for calls to the Phone Feature Manager from the phone connected to the VoIP device. When a VoIP subscriber places calls through the Phone Feature Manager, all of the activated VoIP subscriber features can be made active, and the caller ID presented can be the VoIP subscriber's number, regardless of which device was used to access the Phone Feature Manager.

Call Flow

The TA opens a signaling path with the control logic located in the VoIP platform. The control logic provides the IP address of the destination to the TA and the TA establishes a media path to the endpoint. For calls to other VoIP subscribers, this media path may be to a VoIP subscriber on the same broadband network or a VoIP subscriber on another broadband network. In the latter case, if the two broadband networks use different broadband providers that peer with each other, the traffic will not traverse the backbone network. In the unlikely case where the two providers do not peer with each other but do peer with the backbone network, then the traffic will traverse the backbone network. The connection between the backbone network and the VoIP platform should accommodate all signaling traffic and all single-point off-net media traffic. Where additional enhanced features are provided by the advanced application server(s), it is advantageous for all media to route through the VoIP platform, including calls to both PSTN users and VoIP subscribers. Calls to VoIP subscribers should account for the media stream to the advanced application servers and the media stream from the advanced application servers.

The following flow describes an illustrative call from a VoIP subscriber to a number served by the PSTN.

1) The TA is assumed to have registered with the Class 5 Application Server (ASX) and obtained an IP address. The application server instructs the TA to notify the application server should the PSTN end user go off hook.

2) The end user goes off hook, the application server is notified and instructs the TA to play dial tone.

3) The end user dials a 1+10-digit number. This is independent of whether this is a local or LD call.

4) The TA sends the dialed digits to the application server.

5) The application server processes the digits, querying the policy server to determine that the call is permissible and that it is an off-net call. The policy server provides the appropriate PSTN gateway to the application server.

6) The application server sends a call setup message to the gateway requesting call setup. A two-way RTP stream between the TA and the gateway is established.

7) The gateway queries the policy server to determine the route for the call. Upon receiving the policy server response, the gateway sends a call setup request over the PRI facility to the LNS switch. The setup request includes the end user's TN.

8) The LNS switch uses the rate center associated with the PRI facility and the called party number to route the call to the PSTN. The end user's TN is included in subsequent call setup signaling as the Calling Party Number.

9) When the PSTN switch applies ringing to the called party, the terminating switch plays ringing in the backward direction to the calling party.

10) When the called party answers a two-way bearer path is established and the stable call proceeds.

Figure 4:
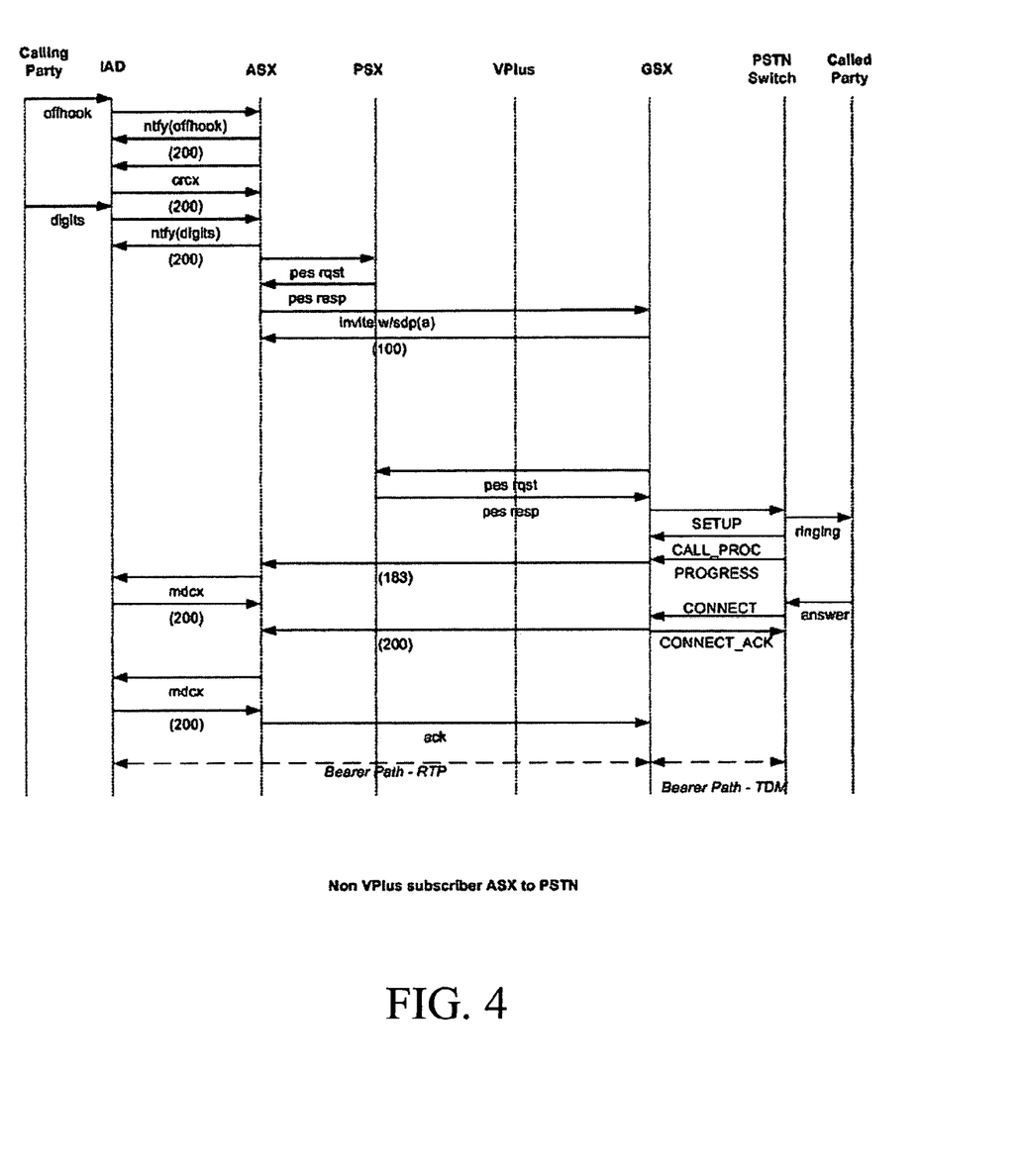
FIG. 4 sets forth an example of signaling flow representing from a calling party to a called party accessible on the PSTN network.

FIG. 4 sets forth an example signaling flow representing call setup signaling for a call from a VoIP subscriber to an end user accessible on the PSTN network.

The following flow describes an illustrative call from a PSTN user to a VoIP subscriber, where the two parties are in the same rate center. This example includes Caller ID.

1) The Calling Party may dial a 7- or 10-digit number, depending on the local dialing plan.

2) The ILEC switch determines that the call is permitted and routes the call to the LNS switch.

3) The LNS switch determines that the number is part of PrimePlex service terminating on the gateway. The LNS switch sends a call setup request over the PRI to the gateway.

4) The gateway queries the policy server to determine the route for the call and the policy server responds that the call should be routed to the application server.

5) The gateway sends a call setup message to the application server.

6) The application server queries the policy server to determine the route for the call and the policy server responds that the call should be routed by the application server.

7) The application server determines that the call receives Caller ID and sends a call setup request and the Caller ID to the TA.

8) The TA rings the telephone and provides the Caller ID to the caller ID equipment.

9) The VoIP subscriber answers and the bearer path is established.

Figure 5:
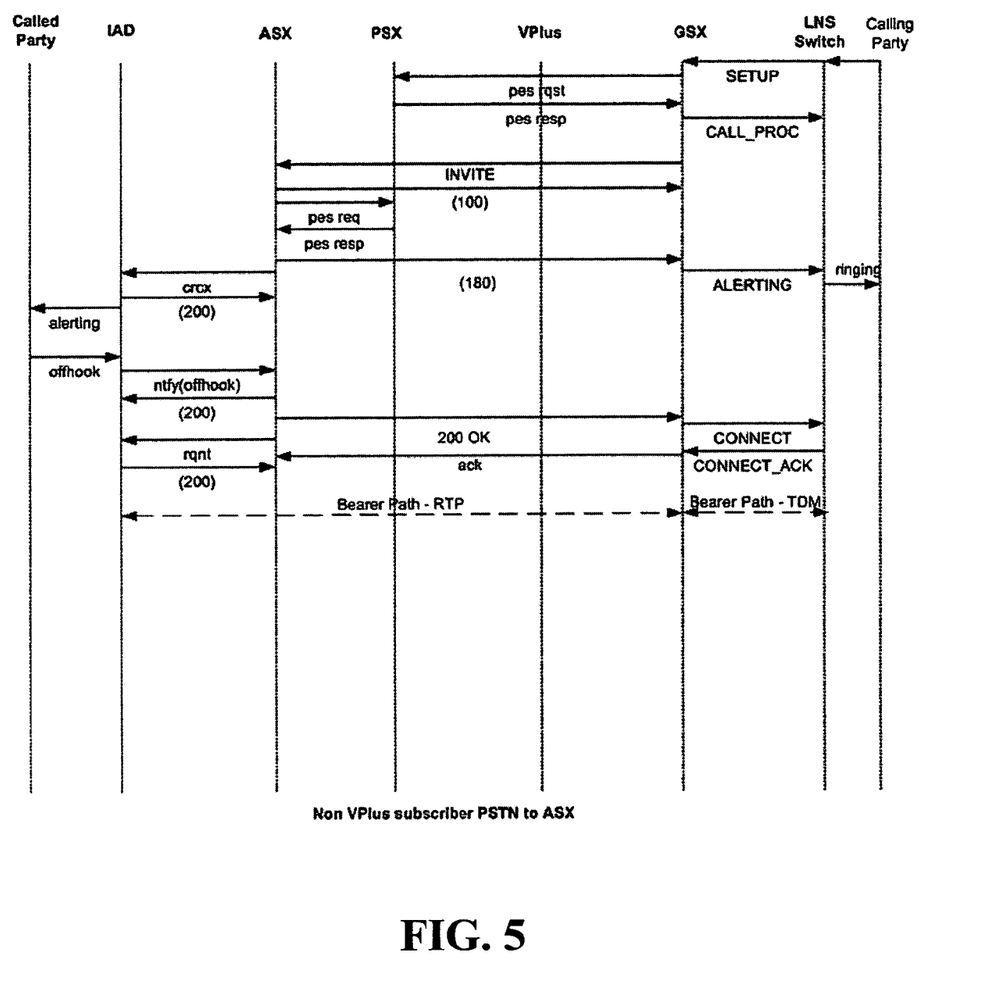
FIG. 5 sets forth an example of signaling flow representing call setup signaling for a call from a PSTN end user (i.e. called party) to a calling party.

FIG. 5 sets forth an example signaling flow representing call setup signaling for a call from a PSTN end user to a VoIP subscriber.

Call Notification "Locate Me" Service Feature

In accordance with an embodiment of the invention, an integrated an enhanced call notification feature is provided which is referred to as "LOCATE ME." This enhanced call notification service feature according to the invention permits a subscriber to control which end device receives an incoming call and in what order. In accordance with a preferred embodiment of the invention, the feature is composed of two sub-features which the inventors refer to as Parallel Ringing and Sequential Ringing as will be described in greater detail below.

The invention further provides a provisioning mechanism which permits a subscriber to self-provision the enhanced call notification service feature. The provisioning mechanism permits a subscriber to specify, for example, the provisioned list and order of telephone numbers and whether to require confirmation of acceptance of the call for the enhanced call notification service feature. A recording mechanism is disclosed which permits a subscriber to record a personalized greeting using a combination of a data service and a packet-switched telephony device.

Figure 6:
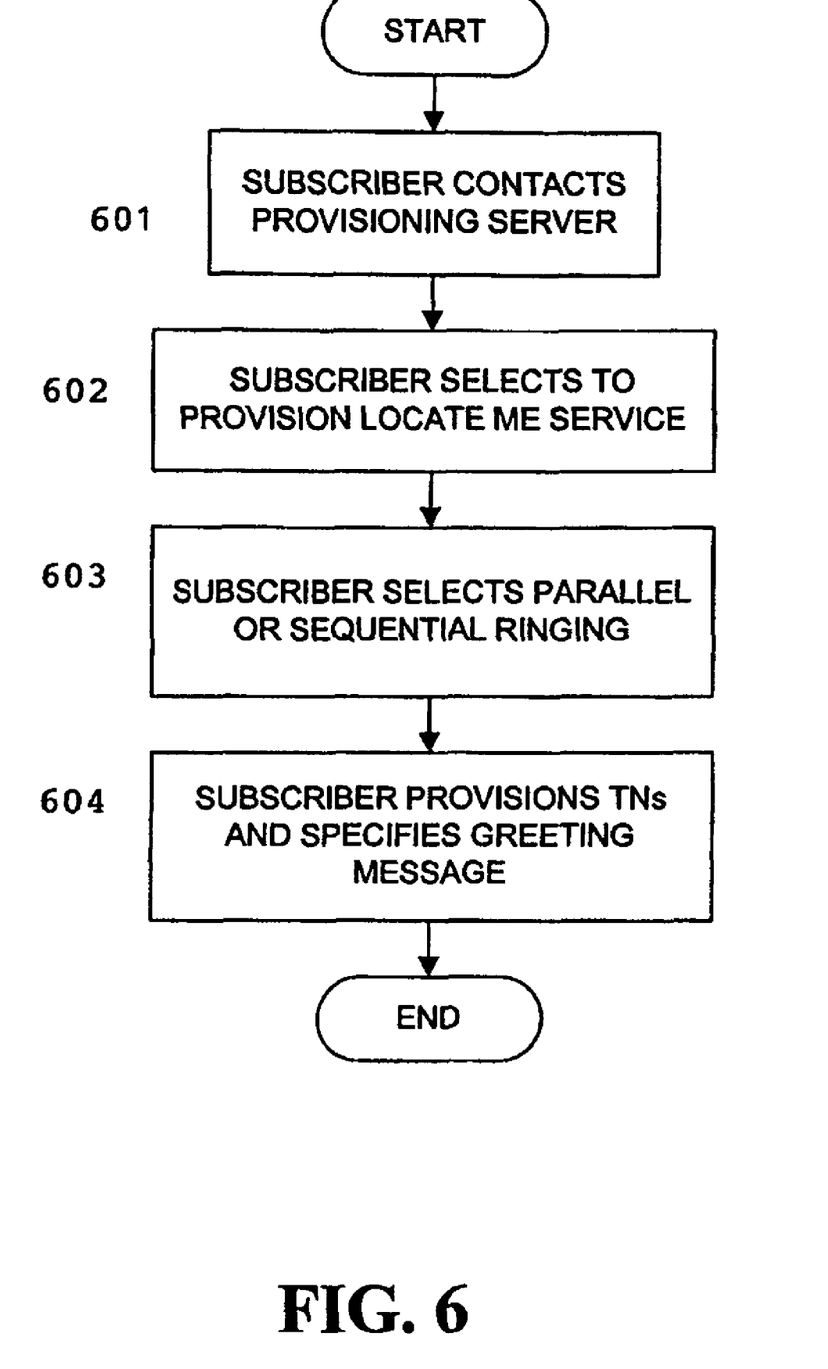
FIG. 6 is a call flow diagram illustrating a subscriber provisioning a "Locate Me" service feature according to an aspect of the invention.

Referring now to FIG. 6, a flow diagram shows processing performed by the VoIP platform as a subscriber provisions the Locate Me service, in accordance with a preferred embodiment of this aspect of the invention. At step 601, the subscriber starts the provisioning process by either using a web browser to access the VoIP web portal or by using the phone to access the Phone Feature Manager. Then, at step 602, the subscriber selects to provision the Locate Me service by activation or de-activating the service. At step 603, the subscriber decides whether to provision the service for parallel ringing (RingAllAtOnce) or for sequential ringing (RingOneAtATime). Then, at step 604, the subscriber provisions the telephone numbers TNs for end devices (up to some maximum such as 5 TNs total, the VoIP TN may be one of these 5 TNs), preferably along with a reminder name to identify the number. These TNs are the end devices provisioned to be located and alerted upon receipt of the call. The subscriber can also select one of the following outgoing message types: (a) Pre-recorded system greeting (This is the default.); (b) Personalized message recorded by the Subscriber; (c) The outgoing message is the same for all callers. The outgoing message need not be used when RingAllAtOnce is selected.

If the subscriber selects a personalized message type, the subscriber can choose to record the message. This can be advantageously accomplished using a "Click to Record" feature, in accordance with an embodiment of another aspect of the invention. The subscriber clicks a relevant button on the website which causes the VoIP device to ring. If the VoIP device is busy or rings with no answer, nothing is recorded. If the subscriber answers, a feature-specific prompt is played and the subscriber records a message. It is advantageous to permit the subscriber to review and/or change the message. The Locate Me service feature can be activated/de-activated without changing the list of Locate Me TNs. In an alternative embodiment, confirmation of acceptance can be varied depending on the particular TN. In this case, the subscriber may provision the alerting to some, but not all, of the listed TNs.

The Parallel Ringing sub-feature of the Locate Me feature allows subscribers to be alerted to incoming calls at a number of devices simultaneously. The subscriber preferably uses the VoIP end-user website portal to specify the various telephone numbers that should be alerted when a call is placed to the subscriber's number. The VoIP TN may be one of these telephone numbers. End devices will alert using their native functionality (e.g., ringing, call waiting, etc.).

Desirably, when a call is answered positively at any one of the end locations, that end location is required to confirm acceptance of the call. This involves an announcement that is played when the device is answered, preferably stating "Incoming call for Subscriber Name. Press 1 to accept the call." This prevents positive confirmation from calls answered by an answering system associated with that location. Use of this feature keeps callers from reaching the answering system associated with these locations; however they will be able to reach the Voicemail feature described below. When an end-user at the answering location presses the '1' key on the keypad to confirm acceptance of the call the caller is connected to the call, and all other locations stop alerting. By default, the Parallel Ringing sub-feature of Locate Me is not active. A subscriber can access the VoIP end-user website portal or access the Phone Feature Manager to activate the sub-feature.

Figure 7:
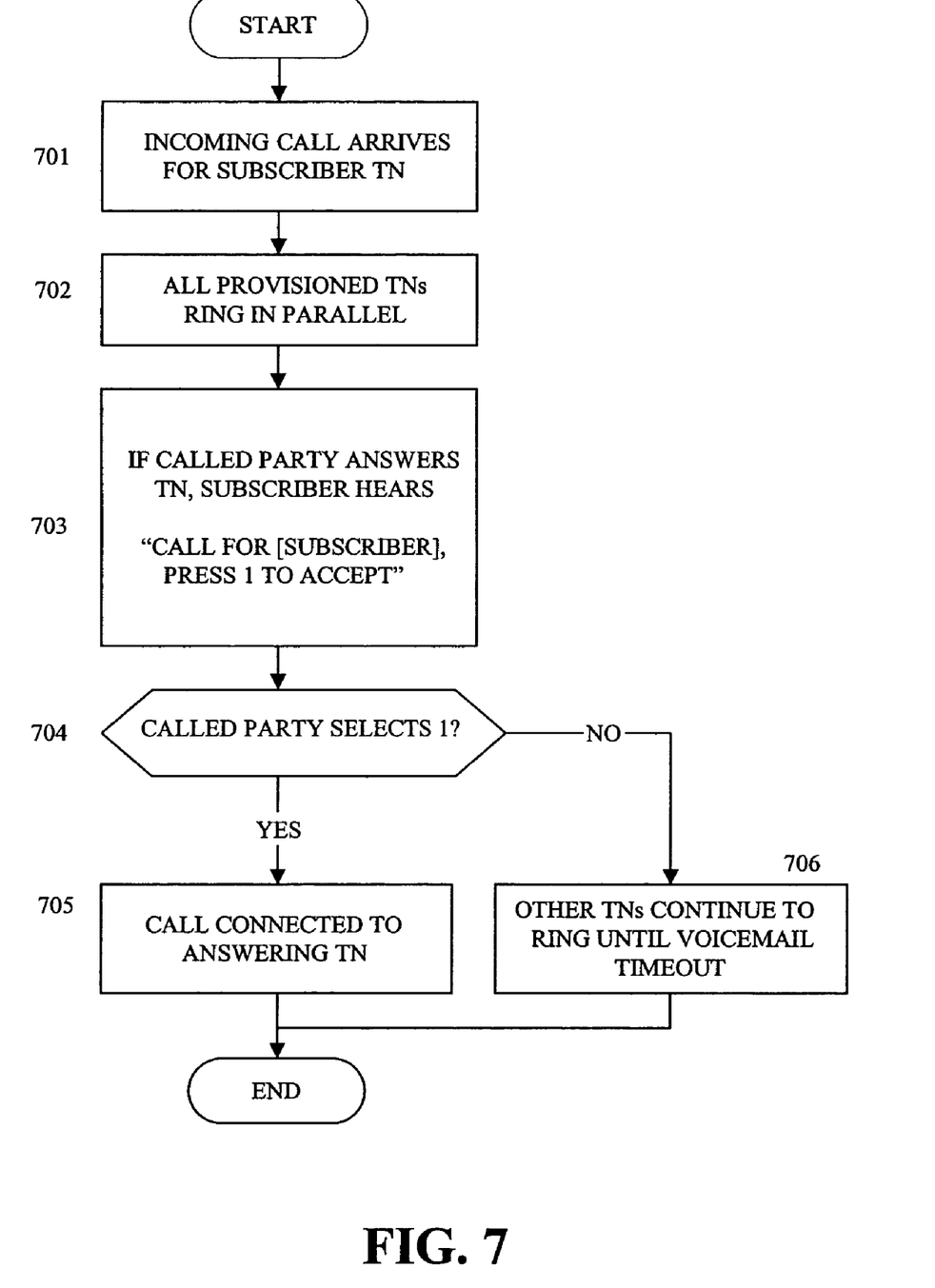
FIG. 7 is a call flow diagram illustrating processing a "Locate Me" parallel ringing service feature according to an aspect of the invention.

Referring now to FIG. 7, a flow diagram shows processing performed by the VoIP platform as the subscriber who has provisioned "Locate Me" service with parallel ringing receives a call, in accordance with a preferred embodiment of this aspect of the invention. At step 701, an incoming call arrives for the subscriber of the end device TN. At step 202, all the TN end devices ring. If any of the Locate Me TNs (including the VoIP TN) is busy, the other Locate Me TN phones still ring. At step 703, if a called party answers one of the TN end devices and the answering TN is provisioned to confirm acceptance of the call, the called party hears the confirm acceptance announcement, for example, "Call for subscriber name. To accept the call Press '1'." If the called party presses 1, alerting on all other TN end devices stops and the call is connected on the answered TN end device as shown in step 705. If multiple Locate Me called parties answer, the first to answer and press 1 to accept the call, gets the call.

If the called party does not press 1 (e.g., an answering machine has answered the call) within a predetermined period (such as 5 seconds) then alerting on the other TN end devices continues as shown as shown in step 706. If the called party places the phone back on-hook, it does not continue to ring, but the other TN end devices continue to ring. If the called party does not press 1 before some other TN answers and presses 1 to accept the call, then the called party hears dead air. If there is no answer/accept on any of the TNs within preferably 30 seconds, then the call goes to the subscriber's voicemail.

The Sequential Ringing sub-feature of the Locate Me feature allows subscribers to be alerted to incoming calls at a number of devices one at a time. When the Sequential Ringing sub-feature of the Locate Me feature is activated, incoming calls to a subscriber's telephone number are immediately answered with an announcement asking the caller to hold while the system tries to reach someone. Calls are placed in sequence to a list of various numbers provided by the subscriber at the VoIP end-user website. Note that the subscriber telephone number can be the same, but that number may belong to various devices of the subscriber. If any of these numbers answers positively (see below), the caller is connected. However, if none of these numbers answers positively, the caller is prompted to leave voicemail. The timeout used to invoke Voice Mail is a system wide timeout it is not the Voice Mail timeout that may have been configured by the subscriber.

If a location answers, it is required to confirm acceptance of the call. This involves an outgoing announcement that is played when the device is answered, preferably stating "Incoming call for subscriber name. Press 1 to accept the call." This will prevent positive confirmation from calls answered by an answering system associated with that location. When an end-user at the answering location presses the '1' key on the keypad to confirm acceptance of the call, the caller is connected to the call, and no other locations will be subsequently called. The outgoing message for this feature may be a system greeting or a custom announcement recorded by the subscriber. Like Parallel Ringing, the Sequential Ringing feature is not active by default. The VoIP subscriber can activate the feature at the customer website or using the Phone Feature Manager.

Figure 8:
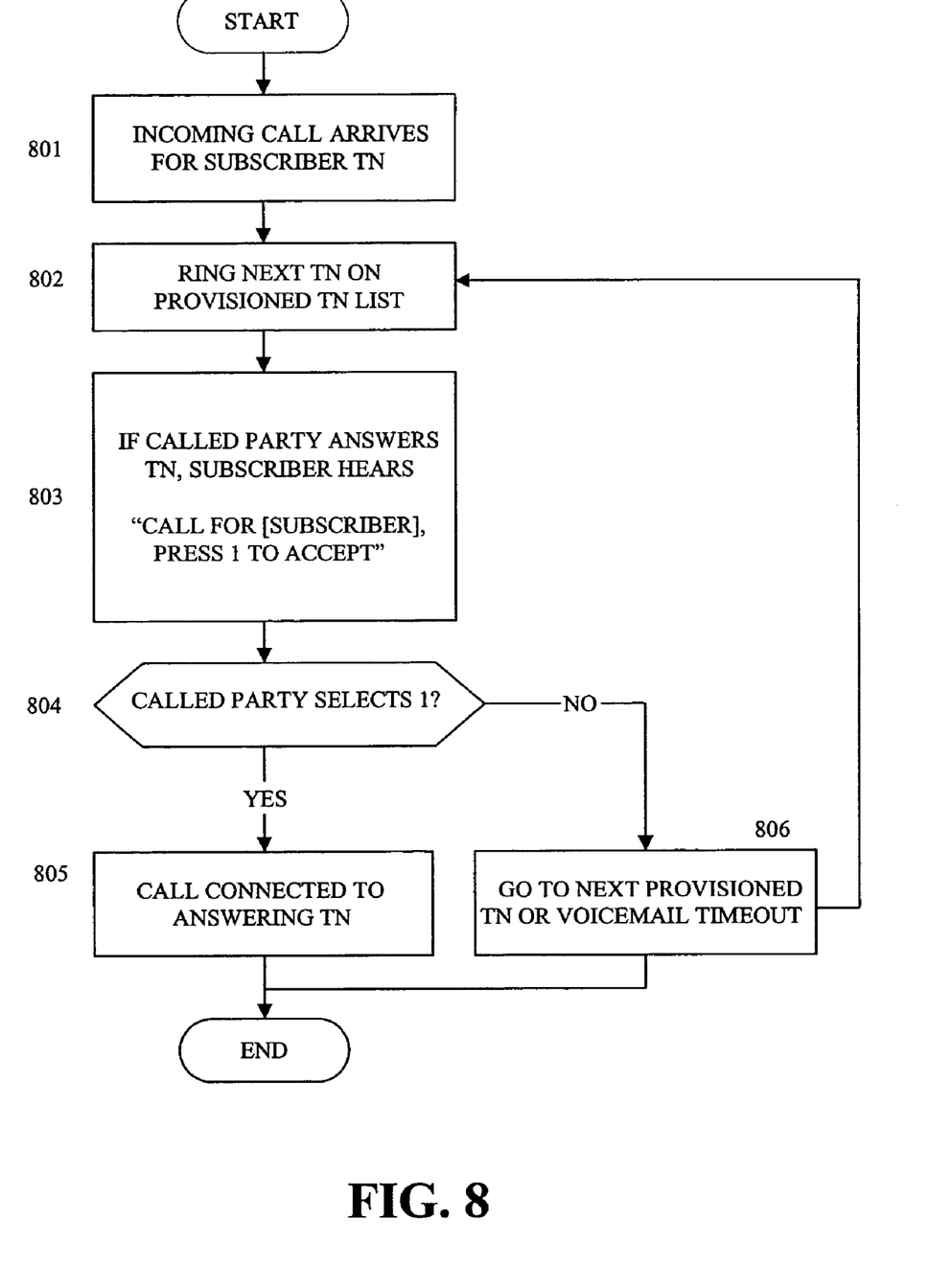
FIG. 8 is a flow diagram illustrating processing a "Locate Me" sequential ringing service feature according to an aspect of the invention.

Referring now to FIG. 8, a flow diagram shows processing performed by the VoIP platform as the subscriber who has provisioned "Locate Me" with sequential ringing receives a call, in accordance with a preferred embodiment of this aspect of the invention. At step 801, an incoming call arrives for the subscriber TN at the end device. The Locate Me feature answers and plays the provisioned outgoing message, for the system greeting something like "Hello. Please hold while we connect your call. You can leave a voice message at any time by pressing '1'." At step 802, the Locate Me feature tries each provisioned TN and/or the subscriber end device in sequence. While the Locate Me feature tries each TN and/or end device in sequence, the caller periodically hears something like "Please hold while we continue connecting your call. You can leave a voicemail at any time by pressing '1'."

If a TN is answered, and the TN is not provisioned to confirm acceptance, the caller is connected with the answered TN. If a TN is answered, at step 803, and the TN is provisioned to confirm acceptance then the called party hears the confirm acceptance announcement, for example, "Call for Subscriber Name. To accept the call Press '1'." If the called party does not press 1 within a predetermined period (such as 5 seconds) (e.g., an answering machine has answered the call), the Locate Me feature goes to the next TN. If the called party presses 1, the call is connected to the answered TN phone at step 805. Alternatively, if the caller presses 1 any time up until the call is answered/accepted, then the caller goes to the subscriber's voicemail and the call flow ends at step 804.

If the called party places the phone back on-hook, the Locate Me feature goes to the next TN. If a TN is busy or if a TN is RNA for more than 30 seconds, the Locate Me feature goes to the next TN. If there are no more TNs, and the list of TNs is exhausted, or the list of subscriber devices is exhausted then the call goes to the subscriber's voicemail.

The foregoing description is to be understood as being in every respect illustrative and exemplary, but not restrictive, and the scope of the invention disclosed herein is not to be determined from the description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to a VoIP service architecture. However, the principles of the present invention could be readily extended to other network service architectures. Such an extension could be readily implemented by one of ordinary skill in the art given the above disclosure.

What is claimed is:

1. A method for providing notification of at least one incoming call from at least one calling party to at least one called party, the method comprising:
   receiving a request to transmit the incoming call from the calling party to a plurality of end devices of the called party;
   retrieving profile information associated with the called party from a single system, wherein said profile information includes data on the plurality of the end devices provisioned to be alerted upon transmission of the incoming call, and on instructions self-provisioned by the called party for alerting the end devices in a specific sequence set-up by the called party; and
   alerting said end devices of the incoming call in said specific sequence, wherein said specific sequence includes a parallel ringing order, a sequential ringing order, and combinations thereof, wherein said plurality of the end devices of the called party are assigned with a same phone number.

2. The method of claim 1 further comprising:
   prompting the called party to confirm acceptance of the call upon answering of the call by one of the said end devices.

3. The method of claim 2 further comprising:
   transmitting the call from the calling party to said one of the said end devices of the called party upon acceptance of the call.

4. The method of claim 2 further comprising:
   ceasing the step of alerting the end devices upon acceptance of the call by said one of the said end devices of the called party.

5. The method of claim 2 further comprising:
   continuing the alerting step if the called party failed to confirm acceptance of the call at said one of the said end devices.

6. The method of claim 2 wherein the prompting step includes:
   playing an announcement to the called party with instructions on confirming the acceptance of the call.

7. The method of claim 2 further comprising:
   prompting the calling party to leave a voice mail message if none of the end devices confirm acceptance of the call.

8. The method of claim 7 further comprising:
   providing the called party self-provisioning features to access and edit the profile information, retrieve the voice mail messages, return calls to the calling parties, active or de-active a locate me service, call a speed dial number, and combinations thereof.

9. A method for providing notification of at least one incoming call from at least one calling party to at least one called party, the method comprising:
   receiving a request to transmit the incoming call from the calling party to a plurality of end devices of the called party, wherein said plurality of the end devices are assigned with same phone number;
   retrieving profile information associated with the called party from a single system, wherein said profile information includes data on the plurality of the end devices provisioned to be alerted upon transmission of the incoming call and on instructions self-provisioned by the called party for alerting the end devices in a sequential ringing order set-up by the called party; and alerting the said end devices of the incoming call in said sequential ringing order.

10. The method of claim 9 further comprising:

prompting the called party to confirm acceptance of the call within a time frame, wherein said called party is prompted upon answering of the call by one of the said end devices.

11. The method of claim 10 further comprising:

transmitting the call from the calling party to said one of the said end devices of the called party upon acceptance of the call within said time frame.

12. The method of claim 10 further comprising:

ceasing the step of alerting the end devices upon acceptance of the call within said time frame by said one of the said end devices of the called party.

13. The method of claim 10 further comprising:

continuing the alerting step if the called party failed to confirm acceptance of the call within said time frame by said one of the said end devices.

* * * * *